UNITED STATES PATENT OFFICE.

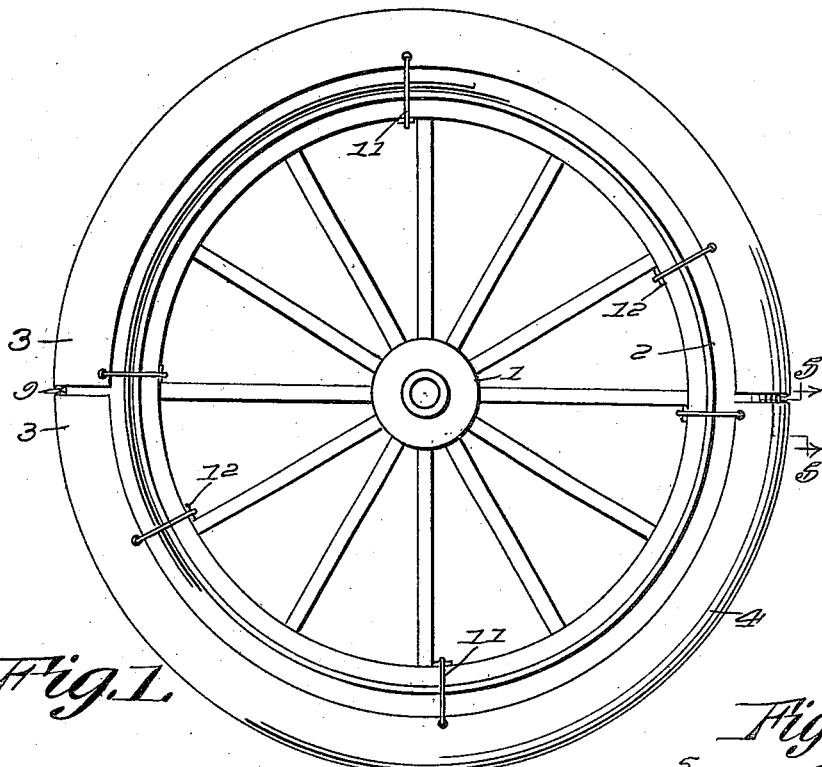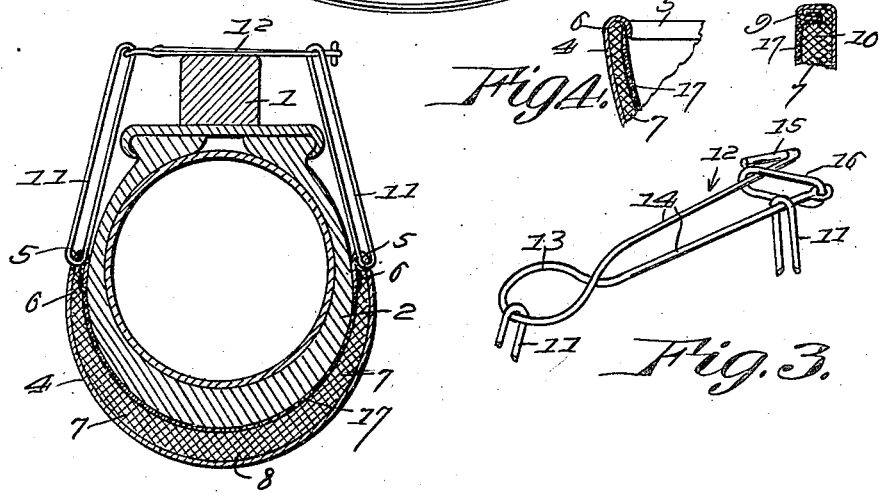

EDWARD P. LE COMPTE, OF PARK CITY, UTAH.

TIRE PROTECTOR.

1,410,484.   Specification of Letters Patent.   Patented Mar. 21, 1922.

Application filed January 4, 1921. Serial No. 434,956.

*To all whom it may concern:*

Be it known that I, EDWARD P. LE COMPTE, citizen of the United States, residing at Park City, in the county of Summit and State of Utah, have invented certain new and useful Improvements in Tire Protectors, of which the following is a specification, reference being had therein to the accompanying drawing.

This invention relates to improvements in tire protecting devices and the object of the invention is to provide a device designed to be placed over the pneumatic or cushion tire of a motor vehicle for the purpose of saving the tire tread from wear during long or continued use. It is a well known fact that the casings of pneumatic tires are subjected to considerable wear during long journeys and it is my idea to furnish means which may be readily attached to the tire at the beginning of the journey for the purpose of protecting the tire during its journey.

Another object of the invention is to furnish a device of the above character which is of simple and inexpensive construction and which will fit the tire casing without liability of wearing or puncturing the same.

With the foregoing objects outlined and with other objects in view which will appear as the description proceeds the invention consists in the novel features hereinafter described in detail, illustrated in the accompanying drawing and more particularly pointed out in the appended claims.

In the drawing:—

Figure 1 is a side view of a motor vehicle wheel and its tire provided with my improved protecting device.

Fig. 2 is a transverse sectional view taken through a portion of the tire and protecting device.

Fig. 3 is a perspective view of an improved fastening means which I have devised for the purpose of securing the protecting device in position.

Fig. 4 is a detail sectional view illustrating the manner in which the side edges of the protecting padding is held within the protective casing.

Fig. 5 is a detail sectional view taken on the line 5—5 of Fig. 1.

In the drawing, 1 designates a motor vehicle wheel provided with a pneumatic tire 2 of any ordinary or special construction.

The improved protector consists of two sections 3, each of which is in the form of a semicircular channel-shaped casing 4 of sheet metal and having the mouth of the channel opening inwardly. The side edges of the casing 4 are bent inwardly as shown at 5 in order to provide two parallel grooves designed to receive the side edges 6 of a strip of padding 7.

This padding 7 is also preferably moulded into semi-circular channel-shaped form and its circumferential central portion 8 is considerably thicker than its edge portions 6. Consequently a thick protecting cushion will be provided for the tread portion of the tire casing. The comparatively thin side edge portions 6 of the padding are designed to be inserted into the grooves formed by the bent over portions 5 of the casing 4 and this form of securing means will provide a smooth inner surface for the protector which will not wear or puncture the outer surface of the tire casing. The ends of the casing 4 of each section are bent inwardly as shown at 9 to form stops which are engaged by the ends of the padding 10, and these stops prevent circumferential movement of the padding within its metal casing 4.

The side edges of the casing 4 are provided with spaced loops or links 11 which are provided at their inner ends with fastening devices 12. Each of these fastening devices as best shown in Fig. 3 consists of a loop 13 which is secured to one of the links 11 and is provided with crossed legs 14, one of which terminates in a hook-shaped member 15 and the other of which is provided with a pivoted link 16 designed to detachably engage the hook for the purpose of securing the links 11 in position. It is of course obvious that other fastening means may be employed in securing the protecting device in position but I prefer to employ the fastening which I have devised.

When it is desired to place the protecting device on the vehicle wheel, the wheel is jacked up and the sections 3 are placed over the tread portion of the tire. Then the fastening devices 12 are secured to the felly of the wheel and the wheel is lowered. During a long journey the sheet metal casings 4 will take up all wear which will otherwise be assumed by the tread of the tire casing, and by the use of the present invention the life of tires may be considerably extended.

In order to prevent the friction, created between the padding 7 and the tire, from deleteriously affecting the tire, I preferably place a strip 17 of asbestos or the like on the inner side of the padding 7.

While I have shown and described a preferred form of my invention, it is apparent that changes and modifications may be made in the construction illustrated without departing from the spirit of the invention as expressed in the claims.

What I claim and desire to secure by Letters-Patent is:

1. A tire protector including a curved segmental sheet metal casing of channel-shaped formation, the side edges of said casing being bent inwardly to form internal grooves, a strip of padding located in the casing and having its side edges detachably engaging said grooves and means for securing said casing and padding to a tire, the ends of said casing being bent inwardly to provide internal stops which combine with the side grooves to form the only means for securing the padding in the casing.

2. A tire protector of the kind defined by claim 1 in which the ends of the casing are bent inwardly to form internal stops, and in which the padding has a thickened central circumferential portion whose ends are engaged by said end stops.

3. The combination with a vehicle wheel tire, of a protecting device including two semicircular sections having their ends arranged in juxtaposition, each of said sections consisting of a semi-circular sheet metal casing of channel-shaped formation, the side edges of said casing being bent inwardly to form internal grooves and the ends of said casing being bent inwardly to form end stops, a semi-circular strip of padding having a channel-shaped cross-section, the central circumferential portion of said padding being thicker than the side edges of the padding, the side edges of the padding engaging the grooves of the casing and the ends of the padding engaging the end loops, and means for securing said casing and padding in position.

4. A tire protector of the kind defined by claim 1, in which a strip of asbestos or the like is placed on the inner side of the padding.

In testimony whereof I hereunto affix my signature in the presence of two witnesses.

EDWARD P. LE COMPTE. [L. S.]

Witnesses:
JOHN SMITH,
WILLIAM JACKSEN.